United States Patent [19]
Bird et al.

[11] Patent Number: 6,128,327
[45] Date of Patent: Oct. 3, 2000

[54] FREQUENCY HOPPING

[75] Inventors: William Eric Bird, Dallas; Alan Triggs, Richardson, both of Tex.

[73] Assignee: Ericsson Inc., Research Triangle Park, N.C.

[21] Appl. No.: 09/015,740

[22] Filed: Jan. 29, 1998

[51] Int. Cl.[7] .............................. H04L 27/30; H04K 1/00
[52] U.S. Cl. .......................... 375/132; 370/343; 455/450
[58] Field of Search ..................................... 375/202, 200, 375/347, 132, 133, 134, 135, 136, 137; 455/441, 447, 450, 422; 370/330, 343

[56] References Cited

U.S. PATENT DOCUMENTS

| | | | |
|---|---|---|---|
| 5,345,600 | 9/1994 | Davidson | 455/441 |
| 5,396,253 | 3/1995 | Chia | 342/104 |
| 5,396,645 | 3/1995 | Huff | 455/33.4 |
| 5,457,810 | 10/1995 | Ivanov et al. | 455/33.2 |
| 5,541,954 | 7/1996 | Emi | 375/202 |
| 5,913,168 | 6/1999 | Moreau et al. | 455/501 |

FOREIGN PATENT DOCUMENTS

| | | |
|---|---|---|
| WO 92/12602 | 7/1992 | WIPO. |
| WO 97/31497 | 8/1997 | WIPO. |

OTHER PUBLICATIONS

PCT Notification of Transmittal of the International Search Report May 27, 1999.

Austin, Mark D., *Velocity Adaptive Handoff Algorithms for Microcellular Systems*, IEEE, vol. 43, No. 3, Aug., 94, pp. 549–561.

Wigard and Morgensen, *A Simple Mapping rom C/I to FER and BER for a GSM Type of Air–Interface*, 1996 IEEE, pp. 78–82.

*On Antenna–And Frequency Diversity in GSM Related Systems (GSM–900, DCS–1800, and PCS1900)* by Preben E. Mogensen and Jeroen Wigard, IEEE (May 1996), pp. 1272–1276.

*Performances of GSM Options in a Cellular Environment* by Håkan Persson, Mobile Radio Conference (1991), pp. 169–174.

*Frequency Hopping, CMS 40 System Feature Description*, Ericsson Inc. (Jul. 25, 1997), pp. 1–26.

*Primary Examiner*—Stephen Chin
*Assistant Examiner*—Betsy L. Deppe
*Attorney, Agent, or Firm*—Jenkens & Gilchrist

[57] ABSTRACT

A system and method in a wireless communications system enables a preferred frequency hopping (FH) sequence to be determined and instituted in real-time. The average speed of mobile stations within a cell is determined or estimated using a variety of techniques. If the average speed is below a predetermined threshold, then a cyclic FH sequence is instituted to achieve superior frequency diversity and therefore combat small-scale fading dips. If the average speed is above a predetermined threshold, then a random FH sequence is instituted to achieve superior interference averaging and therefore combat co-channel interference. Delay timers and a hysteresis may also be used to enhance stability and to counteract short-term fluctuations. The measuring of the average speed and the comparing of the average speed to the threshold are periodically repeated.

26 Claims, 7 Drawing Sheets

- Nonhopping Frequency ($f_0$)(315)
- - - - Nonhopping Frequency ($f_1$)(320)
- Multipath Fading (Frequency Hopping between Two Frequencies)(325)

340

.... $f_4, f_1, f_2, f_3, f_4, f_1, f_2, f_3, f_4, f_1, f_2,$ ....

360

.... $f_1, f_4, f_4, f_3, f_1, f_2, f_4, f_1, f_3, f_3, f_2,$ ....

FREQUENCY HOPPING

BACKGROUND OF THE INVENTION

1. Technical Field of the Invention

The present invention relates in general to the field of wireless telecommunications, and in particular, to a system and method for activating an optimum frequency hopping algorithm in real-time.

2. Description of Related Art

Mobile wireless communication is becoming increasingly important for safety, convenience, work efficiency, and simple conversational pleasure. One prominent mobile wireless communication option is cellular communication. Cellular phones, for instance, can be found in cars, briefcases, purses, and even pockets. To maximize the enjoyment of cellular phones, however, cellular wireless networks must be optimized.

Referring now to FIG. 1 of the drawings, an exemplary cellular wireless network, such as a Global System for Mobile Communication (GSM) Public Land Mobile Network (PLMN) 100, will be described. The PLMN 100 is composed of a plurality of areas 105, each with a Mobile Switching Center (MSC) 110 and an integrated Visitor Location Register (VLR) 115 therein. The MSC/VLR areas 105, in turn, include a plurality of Location Areas (LA) 120, which are defined as that part of a given MSC/VLR area 105 in which a mobile station (MS) (terminal) 125 may move freely without having to send update location information to the MSC/VLR area 105 that controls the LA 120. Each LA 120 is divided into a number of cells 130. Mobile Station (MS) 125 is the physical equipment, e.g., a car phone or other portable phone, used by mobile subscribers to communicate with the cellular network 100, each other, and users outside the subscribed network, both wireline and wireless.

The MSC 110 is in communication with at least one Base Station Controller (BSC) 135, which, in turn, is in contact with at least one Base Transceiver Station (BTS) 140. The BTS is the physical equipment, illustrated for simplicity as a radio tower, that provides radio coverage to the geographical part of the cell 130 for which it is responsible. It should be understood that the BSC 135 may be connected to several base transceiver stations 140, and may be implemented as a stand-alone node or integrated with the MSC 110. In either event, the BSC 135 and BTS 140 components, as a whole, are generally referred to as a Base Station System (BSS) 145.

With further reference to FIG. 1, the PLMN Service Area or wireless network 100 includes a Home Location Register (HLR) 150, which is a database maintaining all subscriber information, e.g., user profiles, current location information, International Mobile Subscriber Identity (IMSI) numbers, and other administrative information. The HLR 150 may be co-located with a given MSC 110, integrated with the MSC 110, or alternatively can service multiple MSCs 110, the latter of which is illustrated in FIG. 1.

The VLR 115 is a database containing information about all of the Mobile Stations 125 currently located within the MSC/VLR area 105. If a MS 125 roams into a new MSC/VLR area 105, the VLR 115 connected to that MSC 110 will request data about that Mobile Station 125 from the HLR database 150 (simultaneously informing the HLR 150 about the current location of the MS 125). Accordingly, if the user of the MS 125 then wants to make a call, the local VLR 115 will have the requisite identification information without having to reinterrogate the HLR 150. In the aforedescribed manner, the VLR and HLR databases 115 and 150, respectively, contain various subscriber information associated with a given MS 125.

Each MS 125 is affected by a myriad of signal-degrading phenomena. For instance, small-scale fading (also called multipath, fast, or Rayleigh fading) creates peaks and valleys in received signal strength when the transmitted signal propagates through terrain populated with signal-reflecting structures. A second signal-degrading phenomenon, large-scale fading (also called log-normal fading or shadowing), reduces received signal strength when the transmitted signal is degraded by large objects (e.g., hills, building clusters, forests, etc.). A third signal-degrading phenomenon, co-channel interference, reduces the ability of an MS 125 to correctly receive a desired signal from a first BTS 140 because an undesired signal from a second, more distant, BTS 140 is interfering. Many other signal-degrading phenomena (e.g., path loss, time dispersion, and adjacent channel interference) adversely impact wireless communications.

Fortunately, many techniques have been developed to combat these signal-degrading phenomena. Some examples are channel coding, interleaving, equalization, antenna diversity, and frequency diversity. Frequency diversity has several possible implementations, one of which is frequency hopping (FH). Furthermore, FH can be instituted with many different algorithms. Only one of the many FH algorithms is instituted within any one cell 130 in existing systems. Conventionally, in fact, the type of FH algorithm is selected when the system is designed. Unfortunately, the optimum FH algorithm can vary depending on current conditions within the cell 130. In summary, existing systems have heretofore only instituted a single FH algorithm within any given cell.

SUMMARY OF THE INVENTION

The present invention addresses the above (and other) deficiencies in the prior art by achieving the following (and other) objects of the invention:

An object of the invention is to provide a system and method that measures one or more parameters of mobiles within a cell.

Another object of the invention is to provide a system and method that can switch from one frequency hopping (FH) algorithm to another FH algorithm while the system is supporting users (i.e., in real-time).

A further object of the invention is to implement a system and method for changing from a cyclic FH sequence to a random FH sequence.

Yet another object of the invention is to implement a system and method that can determine the average speed of mobiles within a given cell.

A still further object of the invention is to implement a system and method for selecting a cyclic sequence when the average speed of mobiles is relatively low and a random sequence when the average speed of mobiles is relatively high.

These objects are achieved with a system and method for a wireless communications system in which a preferred frequency hopping (FH) sequence can be instituted based on one or more measured system parameters. In one embodiment the speed of each mobile station (MS) within a cell is measured over a period of time. The measurements may be precise or estimated, and the measurements may be effectuated with any technique such as those relying on Timing Advance, Handover Timers, Locating Techniques, and Doppler Measurements. The speed of each individual MS is then averaged together to calculate the overall average MS speed.

This overall average MS speed within the cell is then used to determine a preferred FH sequence. For example, if the average speed is relatively low, then a cyclic FH sequence is instituted to achieve superior frequency diversity and therefore combat small-scale fading dips. If, on the other hand, the average speed is relatively high, then a random FH sequence is instituted to achieve superior interference averaging and therefore combat co-channel interference. After a switch is made from one FH sequence to another, new measuring of the speed of the mobile stations is delayed for a predetermined period of time.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

A preferred embodiment of the present invention and its advantages are best understood by referring to FIGS. 1–6 of the drawings, like numerals being used for like and corresponding parts of the various drawings.

Figure 1:
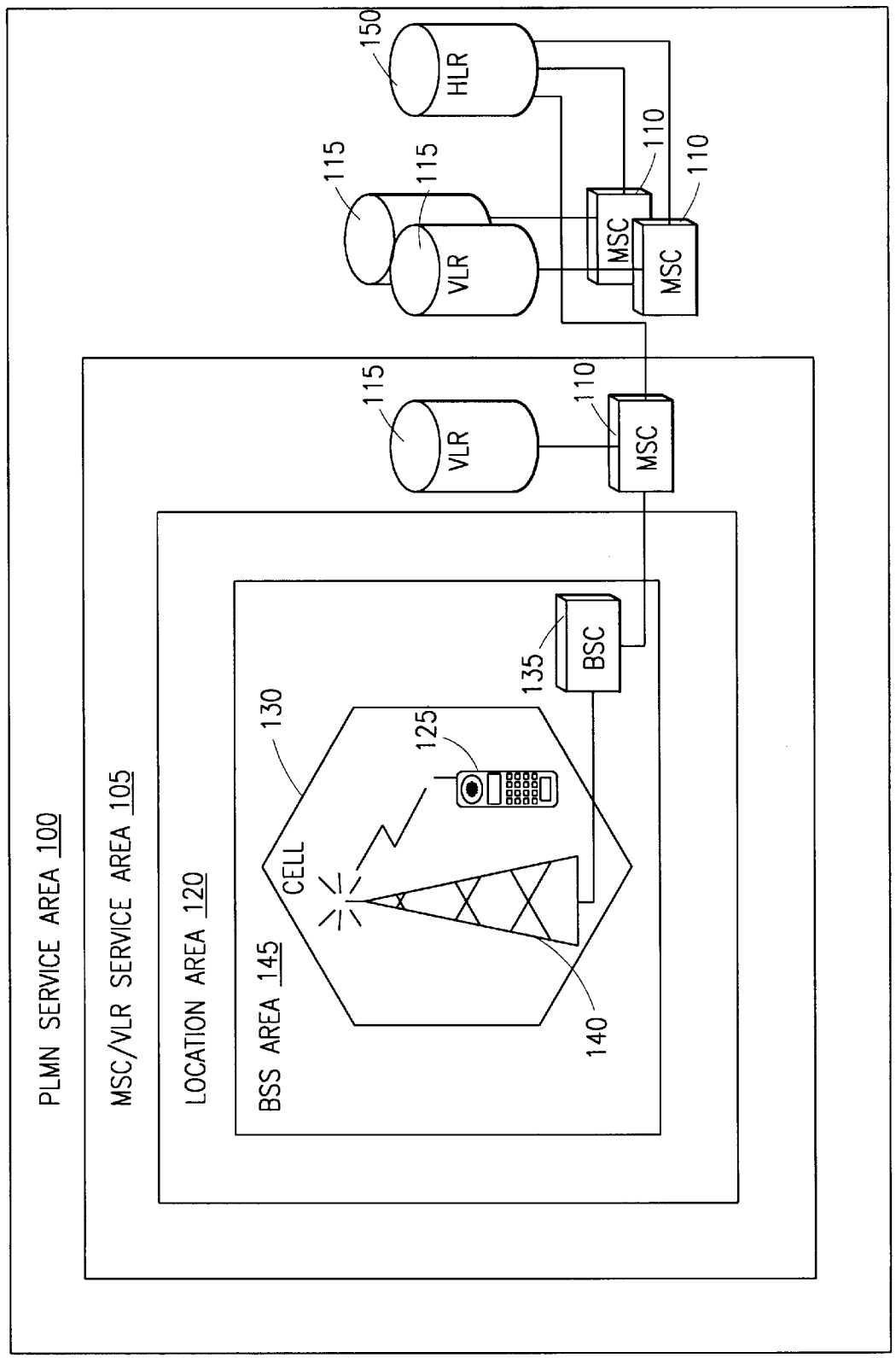
FIG. 1 illustrates an exemplary cellular wireless network in which the present invention may be practiced.
Figure 2A:
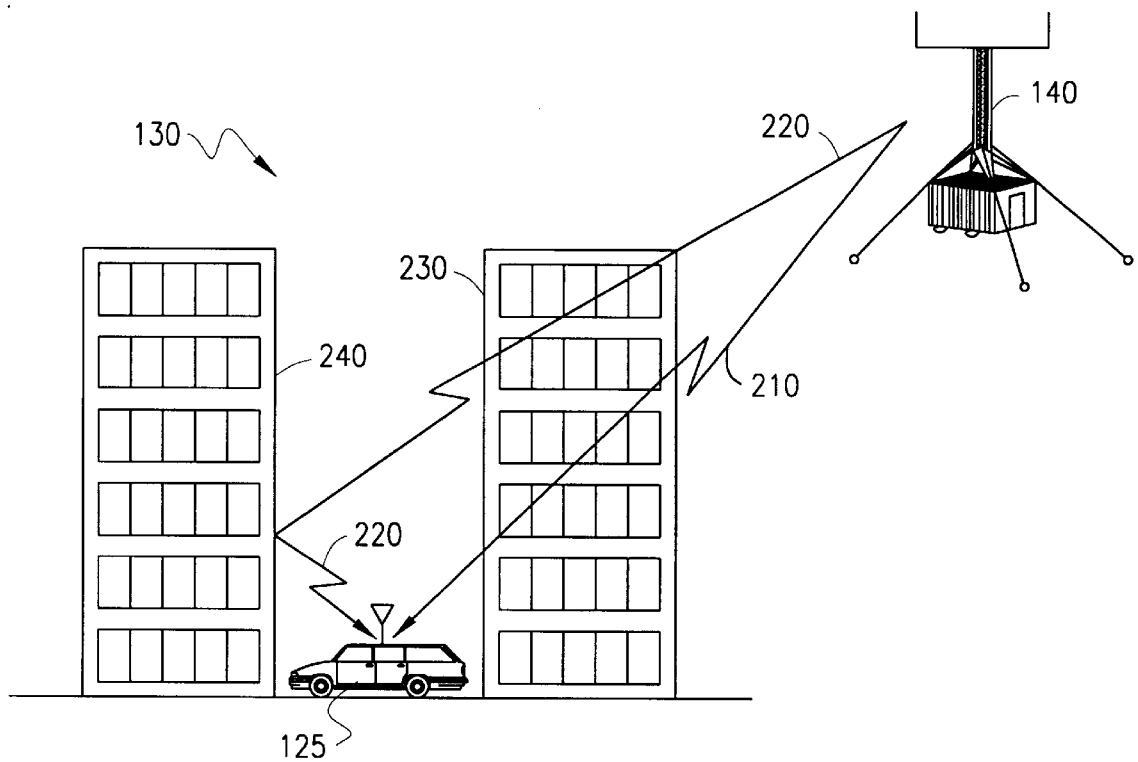
FIG. 2A illustrates a small-scale fading phenomenon in wireless communications.

FIG. 2A illustrates a small-scale fading phenomenon in wireless communications. In a cell 130, an MS 125 is receiving signal 210 and reflected signal 220 from a BTS 140. The cell 130 includes various obstacles such as obstacles 230 and 240. The desired signal is transmitted from the BTS 140 and propagates over multiple paths to reach the MS 125. The signal 210 and the reflected signal 220 are consequently out of phase and may cancel (or augment) each another. The canceling causes sudden dips in signal strength.

Figure 2B:
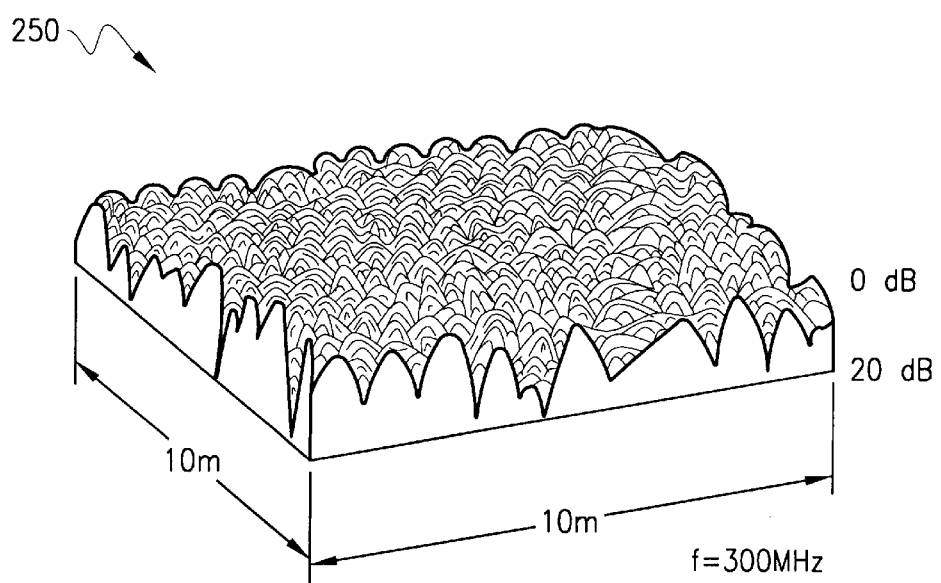
FIG. 2B illustrates in graphical form a dependence of small-scale fading dips on the physical position of a mobile station.

FIG. 2B illustrates in graphical form a dependence of small-scale fading dips on the physical position of a mobile station. Graph 250 represents the signal strength received within a 10 meter by 10 meter square at a frequency of 300 MHZ in a built-up area (e.g., a city). Severe fluctuations, both peaks and dips, are shown to occur within only 10 meters. As an approximation, the distance between two dips is typically about half a wavelength (e.g., about 8 cm for the Personal Communications System (PCS) 1900). It should be noted that for different frequencies the fading dips occur at slightly different positions in space.

Figure 2C:
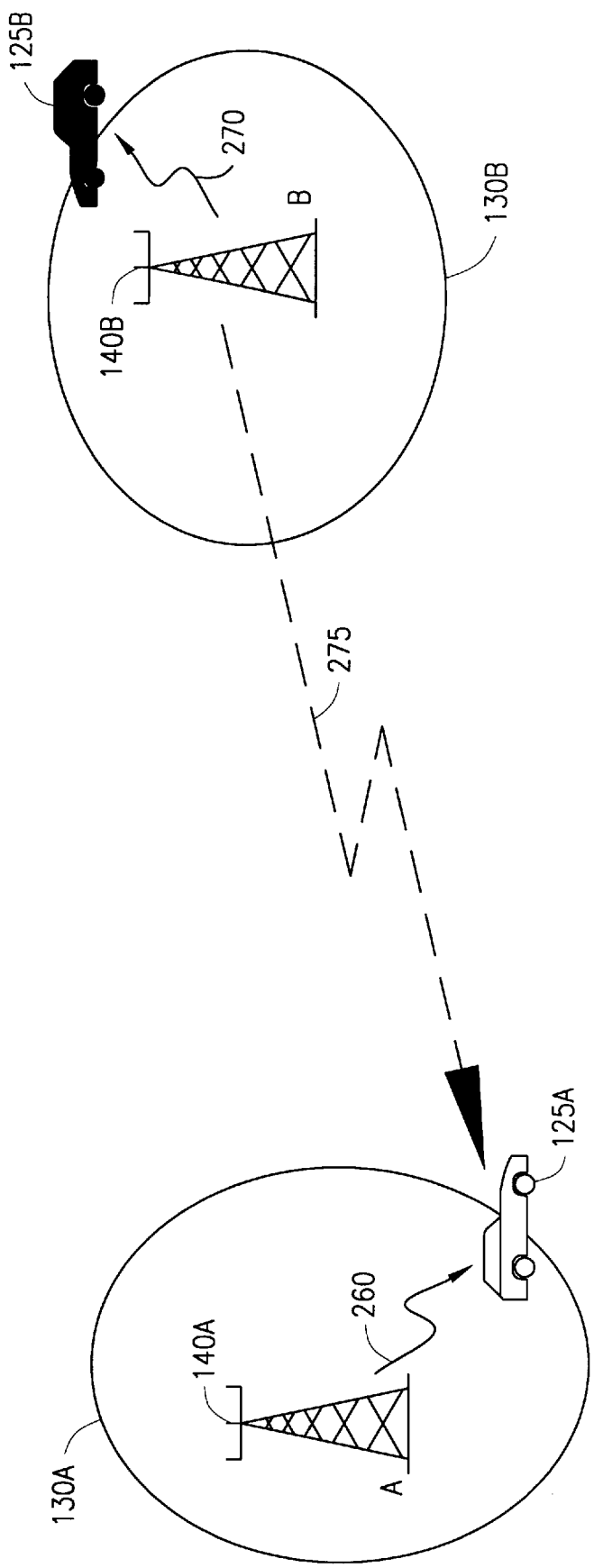
FIG. 2C illustrates a co-channel interference phenomenon in cellular wireless communications.

FIG. 2C illustrates a co-channel interference phenomenon in cellular wireless communications. Cells 130A and 130B are shown with a BTS 140A and a BTS 140B, respectively. The BTS 140A is in communication with an MS 125A, which is near the edge of the cell 130A, and is transmitting a signal 260. The BTS 140B is in communication with an MS 125B, which is near the edge of the cell 130B, and is transmitting a signal 270. Because the MS 125B is near the edge of the cell 130B, the BTS 140B must transmit at or relatively near the maximum-allowed power. Furthermore, because cellular frequencies are reused, signal 260 and signal 270 can be transmitted at the same frequency. The BTS 140B may therefore be transmitting signal 270 so that it interferes with the ability of the MS 125A to properly receive the desired signal, signal 260. This interfering signal is shown as interfering signal 275.

Frequency hopping (FH) can be used to combat the deleterious effects of small-scale fading and co-channel interference. In the description that follows, certain wireless communication principles incorporated into the GSM specification will be used to illuminate the teachings of the present invention, but the present invention is not intended to be so limited. For instance, cellular frequency reuse and Time Division Multiple Access (TDMA) are assumed to be implemented within the cellular wireless network of FIG. 1. Also, within each cell 130, a given sub-set of frequencies are assigned for use. An MS 125 (and the BTS 140 in communication therewith) can switch to a new frequency between each time slot.

Many different FH algorithms (hopping sequences) can be instituted within a cell 130. In cyclic FH, frequencies are used in consecutive order. For example, the sequence can begin with the lowest-numbered frequency and proceed to the highest-numbered frequency before repeating. In random FH, the sequence is preferably implemented as a pseudo-random sequence that is stored in a lookup table in both the MS 125 and the BTS 140. The number of independent sequences that are defined is preferably 63, but the invention is intended to encompass any number.

When orthogonal sequences are used in FH, a frequency offset (e.g., the Mobile Allocation Index Offset [MAIO]) is automatically assigned to each channel at configuration. As a result, each traffic channel in a cell uses the same sequence, but with different frequencies at each moment in time. Co-channel cells are also given independent random sequences. Thus, while connections use the same frequencies, they do not always do so at the same time. With this frequency independence, connections rarely interfere with each other. This results in good interference averaging.

Figures 3A, 3B, 3C:
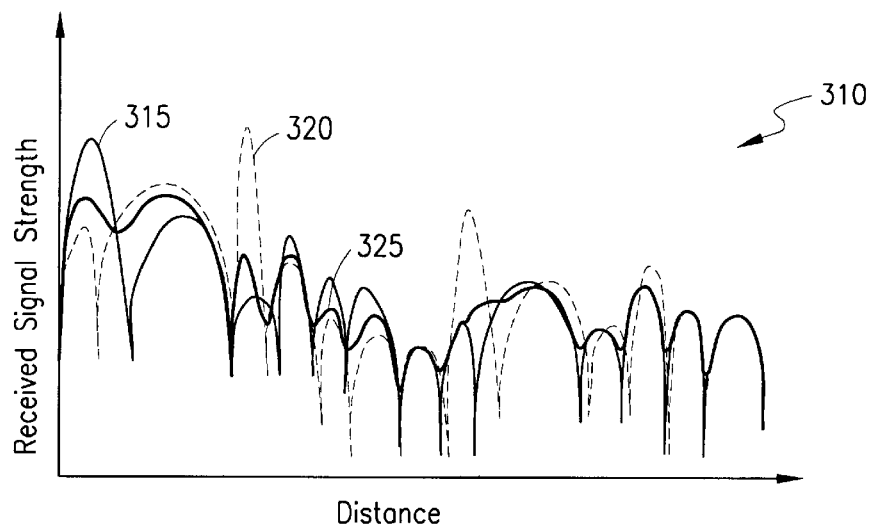
FIG. 3A illustrates in graphical form the improved signal reception derived from frequency hopping.
FIG. 3B illustrates a cyclic frequency hopping sequence.
FIG. 3C illustrates a random frequency hopping sequence.

Two positive effects from FH are interference averaging and a reduction in small-scale fading due to frequency diversity. FIG. 3A illustrates in graphical form the improved signal reception derived from frequency hopping. The improved signal results from reducing small-scale fading by implementing frequency diversity. Graph 310 shows Received Signal Strength (RSS) plotted versus Distance. Two signals transmitted on non-hopping frequencies (315 and 320) are shown as thin solid and thin dashed lines, respectively. A third signal transmitted with FH on two frequencies (325), which provides the frequency diversity, is shown as a thick solid line. The frequency hopped signal 325 smooths the RSS and reduces the signal-degrading effects of dips caused by small-scale fading.

Interference averaging is another benefit derived from FH. FH can break up persistent interference into periodic occurrences of single-burst interference. Changing frequency at each burst specifically improves co-channel interference also. The co-channel interference changes every burst, which is beneficial for connections that otherwise might suffer from severe interference during the entire connection. In addition, the interference that one connection causes another is spread to single bursts over a time period instead of continuous transmission on the same frequency. This interference averaging beneficially causes the radio interference to become more even. Furthermore, the relatively short-duration interference (e.g., one burst) can usually be overcome by, for example, coding and interleaving. Interference averaging therefore helps to alleviate, for example, co-channel interference.

FIG. 3B illustrates a cyclic frequency hopping sequence. In the cell 130 (or other relevant wireless system unit), Cyclic FH sequence 340 preferably repeats all or a portion of the available frequencies in a predefined (e.g., numerical) order. FIG. 3C illustrates a random frequency hopping sequence. In the cell 130 (or other relevant wireless system unit), Random FH sequence 360 preferably reflects a pseudo-random sequence stored within the wireless system (including each MS 125).

Within a single cell, cyclic FH typically combats small-scale fading better than random FH because with cyclic FH an immediately subsequent frequency will fade independently from the prior frequency. Hence, frequency diversity is superior with cyclic FH because small-scale fading dips will rarely occur on subsequent transmission/reception bursts because of the frequency dependency of Graph 250. Random FH, on the other hand, typically combats co-channel interference better than cyclic FH because random FH provides better interference averaging. Cyclic FH provides inferior interference averaging because of the possibility that, for example, signal 260 and interfering signal 275 (of FIG. 2C) could become locked into sequencing through the same cycle of frequencies. Hence, the co-channel interference could be constant throughout the mutual connections.

Whether it is more important to combat small-scale fading or co-channel interference depends, among other things, on the speed of the mobile stations within a given cell. At high user speed, an MS 125 is moving through space (e.g., see Graph 250 of FIG. 2B) so quickly that the MS 125 physically moves out of a current fading dip at a current frequency before the MS 125 hops to a new frequency. Therefore, for mobile stations at high velocity, co-channel interference is more of a limiting factor and random FH is preferable (to avoid the possible lock-step cycling through a sub-set of frequencies). For mobile stations at lower velocities, small-scale fading is more of a limiting factor and cyclic FH is preferable (to avoid back-to-back bursts on the same frequency).

In summary, FH can be used to combat fading (e.g., multi-path) and interference (e.g., co-channel) on the air-interface. The present invention overcomes the drawbacks of having a fixed hopping sequence that is set in the switch for each cell (and the mobile stations in that cell) by switching FH algorithms based on an MS parameter (e.g., speed). The FH sequence algorithms are preferably of two types—cyclic or random. For slow moving or stationary mobile stations, a cyclic FH sequence will combat fading dips well, as any two frequencies in the sequence will fade independently if the separation is sufficient. For high speed mobile stations, the interference averaging effect of a random FH sequence is more important, as the speed of the MS alone will combat the fading dips.

If the hopping sequence in a cell is chosen to be random, slow moving or stationary mobile stations may use the same frequency for two or more consecutive bursts. If that frequency happens to suffer severe fading, the received signal strength will be very poor. If the hopping sequence in the cell is chosen to be cyclic, the high speed mobile stations do not benefit, and the interference averaging is sub-optimal in the system.

The statistical allocation of the FH sequence algorithm of the present invention will allow the system to automatically select either a random or a cyclic sequence on a per cell basis in real time.

Figure 4:
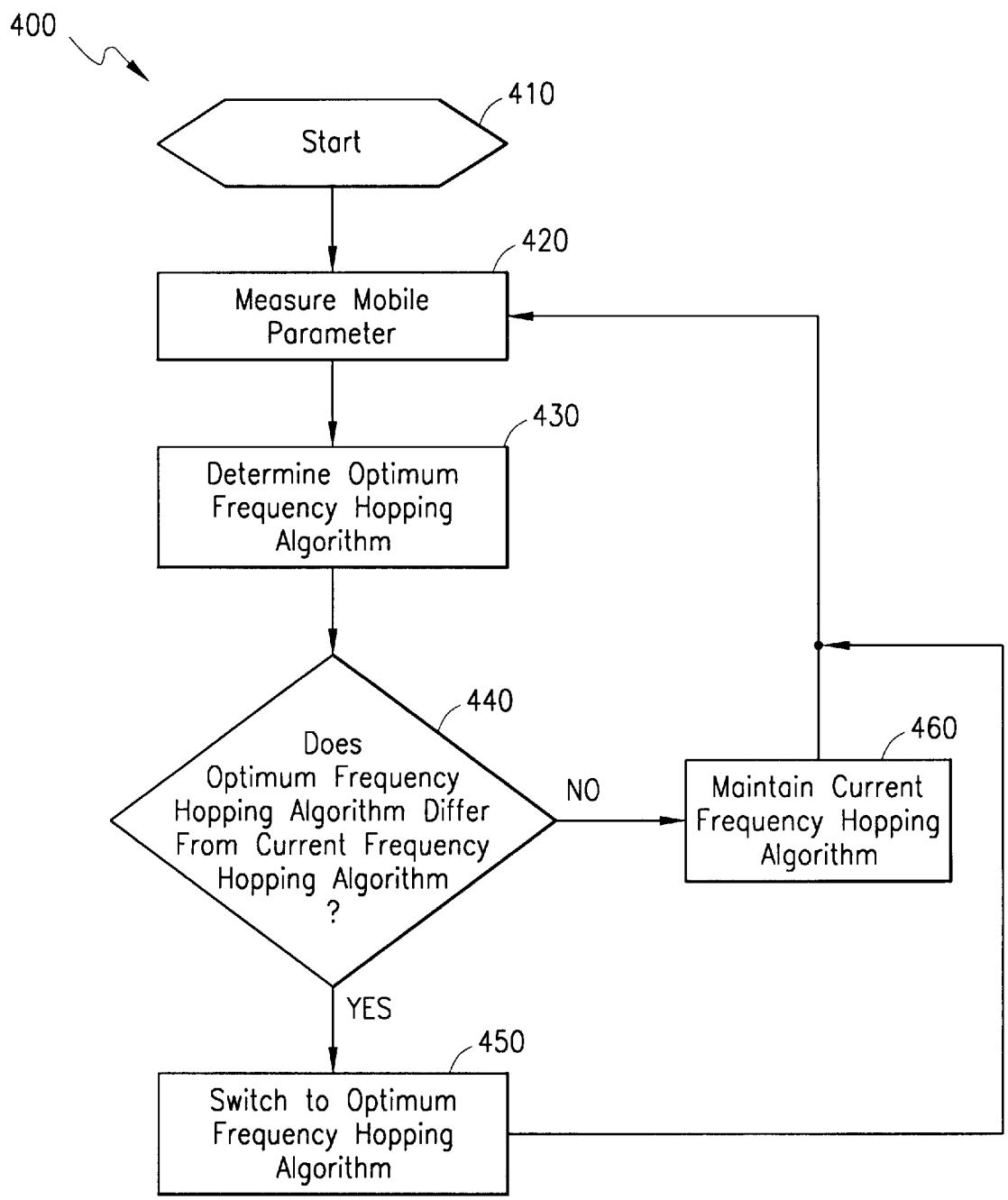
FIG. 4 illustrates in flowchart form a selection process between or among different frequency hopping algorithms to optimize signal reception according to a first embodiment of the present invention.

FIG. 4 illustrates in flowchart form a selection process between or among different frequency hopping algorithms to optimize signal reception according to a first embodiment of the present invention. A process according to the first embodiment is represented by flowchart 400 and starts at step 410. The wireless system (e.g., of FIG. 1) measures at least one parameter for each of the mobile stations 125 within a given cell 130 at step 420. The parameter data for all mobile stations 125 in the entire cell 130 is then analyzed and/or combined in some fashion (e.g., averaged).

From this analysis, the system determines at step 430 an optimum (or at least preferred) FH algorithm. At step 440, the system ascertains whether the currently instituted FH algorithm differs from the optimum FH algorithm. If not, then the system maintains the use of the current FH algorithm at step 460 and may repeat the measuring step 420. If, on the other hand, the currently instituted FH algorithm does differ from the optimum FH algorithm, then the system switches to the optimum FH algorithm in step 450 before repeating any measurement in step 420.

Figure 5:
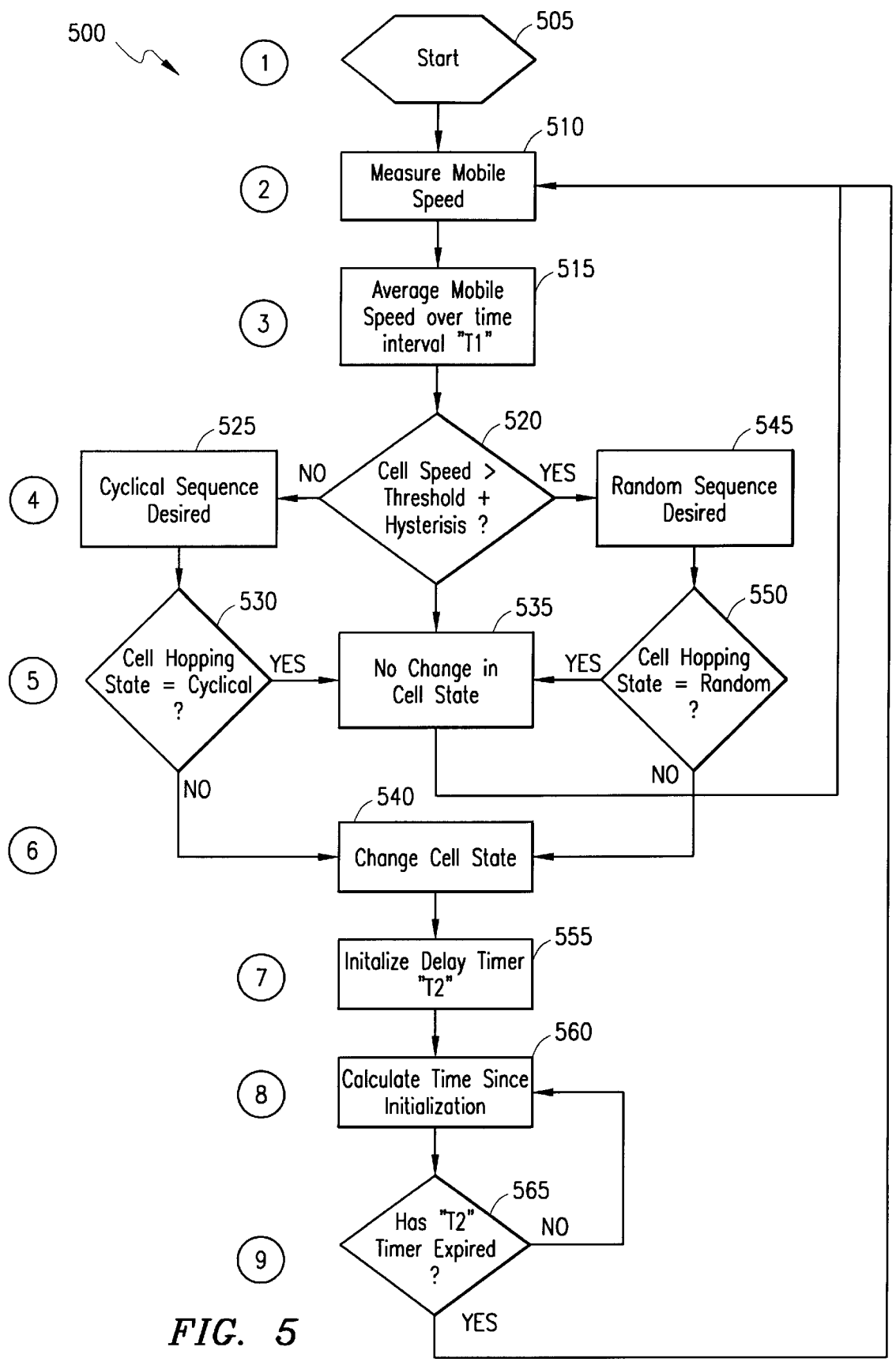
FIG. 5 illustrates in flowchart form a process of statistical allocation of frequency hopping sequences according to a second embodiment of the present invention.

FIG. 5 illustrates in flowchart form a process of statistical allocation of frequency hopping sequences according to a second embodiment of the present invention. The sequence (or FH algorithm) selection process is represented by flowchart 500. Each phase and step is numbered. The description that follows is organized by phases (the encircled numbers).

In phase ①, the process begins at step 505 as the feature is activated in the system.

In phase ②, the speeds of the mobile stations 125 within the relevant cell 130 are measured at step 510. This can be accomplished by a number of current or future methods and techniques, an exemplary list of which is provided and explained below.

The first speed measurement technique relies on the Timing Advance (TA). By measuring the rate of change of the TA, it is possible to estimate the speed of an MS. Mobile stations will receive a TA between 0 and 63, depending on the distance from the cell. If the TA increases or decreases continuously during a call, that particular MS is moving. The rate of change of the TA is proportional to the speed of the MS.

The second speed measurement technique relies on Handover Timers. A number of call statistics can be gathered to determine the number of mobile stations handing in or out of a cell and the length of time an MS spends in one cell. Currently, statistics like this form the basis of Hierarchical Cell Structure (HCS) decisions. By measuring the rate at which an MS is entering and leaving cells in a dense area, the MS can be categorized as either fast or slow moving.

The third speed measurement technique relies on Locating Techniques. A number of Locating Techniques are being implemented for mobile communications, including the Global Positioning System (GPS) and the Time Difference of Arrival (TDOA) (e.g., triangulation with multiple base transceiver stations 140) techniques. These techniques will be implemented to pinpoint the geographic location of an MS. By measuring the rate of change of location, it is possible to accurately determine the speed of an MS.

The fourth speed measurement technique relies on Doppler Measurements. Future enhancement to oscillators and filters will permit the accurate measurement of Doppler Shift (DS). An MS is allocated a particular frequency during a call. The base station receiver (at a BTS 140) is tuned to "listen" for this frequency. Assuming the oscillator in the MS is ideal, the received signal frequency, $f_2$, at the base station will be:

$$f_2 = f_1 + f_d \quad (1)$$

where $f_1$ is the mobile transmit frequency, and $f_d$ is the Doppler Shift:

$$f_d = \frac{v}{\lambda} \cos\theta \quad (2)$$

where $\lambda$ is the wavelength of the transmitted signal, and $\theta$ is the direction of travel, relative to a straight line between the MS 125 and the BTS 140. Hence, the received frequency at the BTS 140 is a function of the velocity of the MS 125 and the direction of travel.

Subsequently, the Doppler Shift can be used to estimate the speed of an MS 125. However, it can only be used to "estimate". While mobile stations 125 traveling to, or from, the BTS 140 will permit an accurate measurement of the speed of the mobile stations 125, mobile stations 125 traveling at any other angle will not (as the BTS 140 will not know the angle). However, this sequence (FH algorithm) selection process only requires a binary decision (fast or slow), and all mobile stations 125 will be averaged throughout the cell 130. Therefore, the Doppler Shift can give a good estimate of the average speed of all mobile stations 125 in the cell 130, and the mobile stations 125 can then be categorized as fast or slow.

In phase ③, the average speed of the mobile stations 125 in the cell 130 is determined at step 515. The average is preferably determined by calculating the mean, but other averaging calculations (e.g., the mode) are also considered to be within the scope of the present invention. A filter length (delay period), T1, defines a short period of time over which the speed measurements are averaged. A large value for T1 provides a more accurate speed measurement and removes any instantaneous fluctuations in the value.

In phase ④, the average speed of the mobile stations 125 within the cell 130 are compared to a threshold and a hysteresis. The average speed (as determined in step 515) is compared with the operator defined threshold in step 520 (the decision in step 520 becomes whether the "Cell Speed<Threshold−Hysteresis?" as the average cell speed decreases from a point above the "Threshold+Hysteresis"). If the average speed is greater than the threshold plus a hysteresis, the mobile stations 125 are determined to be predominantly "fast", and a random hopping sequence is desired in the cell 130 (step 545). If the average speed is less than the threshold minus the hysteresis, the mobile stations 125 are determined to be predominantly "slow", and a cyclic hopping sequence is desired in the cell 130 (step 525).

Advantageously, according to the present invention, the operator has the flexibility to choose a threshold value that suits the cell plan. The breakpoint speed is preferably approximately 35 km/hr. This means that for speeds above 35 km/hr a random sequence is desirable and that for speeds below 35 km/hr a cyclic sequence is desirable. The operator, however, may vary this threshold as desired. A hysteresis parameter is also included to suppress any minor fluctuations about the threshold speed (as explained further hereinbelow with reference to FIG. 6).

In phase ⑤, the current cell state, and thus whether the state needs to change, is determined. Once the preferred sequence is determined in phase ④, the current sequence is checked to see if they are the same (steps 530 and 550). If they are the same, no change in the sequence is required (step 535), and the process jumps back to again measure the average speed of the mobile stations 125 at step 510. If the sequences do not match, the process continues with step 540.

In phase ⑥, the cell state is changed at step 540. If the preferred sequence is not the same as the current one, the sequence is changed in the cell 130. The sequence can be changed by halting the cell. However, during peak hours, it is undesirable to halt the cell. A better approach is to automatically change the sequence on an individual timeslot basis. This can be accomplished either by waiting for a timeslot to become free or by forcing intra-cell handovers.

In phases ⑦, ⑧, and ⑨, a delay loop is implemented. A delay timer, T2, is initialized at step 555. This delay timer prevents the hopping sequence state from switching too frequently between random and cyclic sequences. Once the timer expires (as determined in steps 560 and 565), the process returns to step 510 to measure the speed again.

Figure 6:
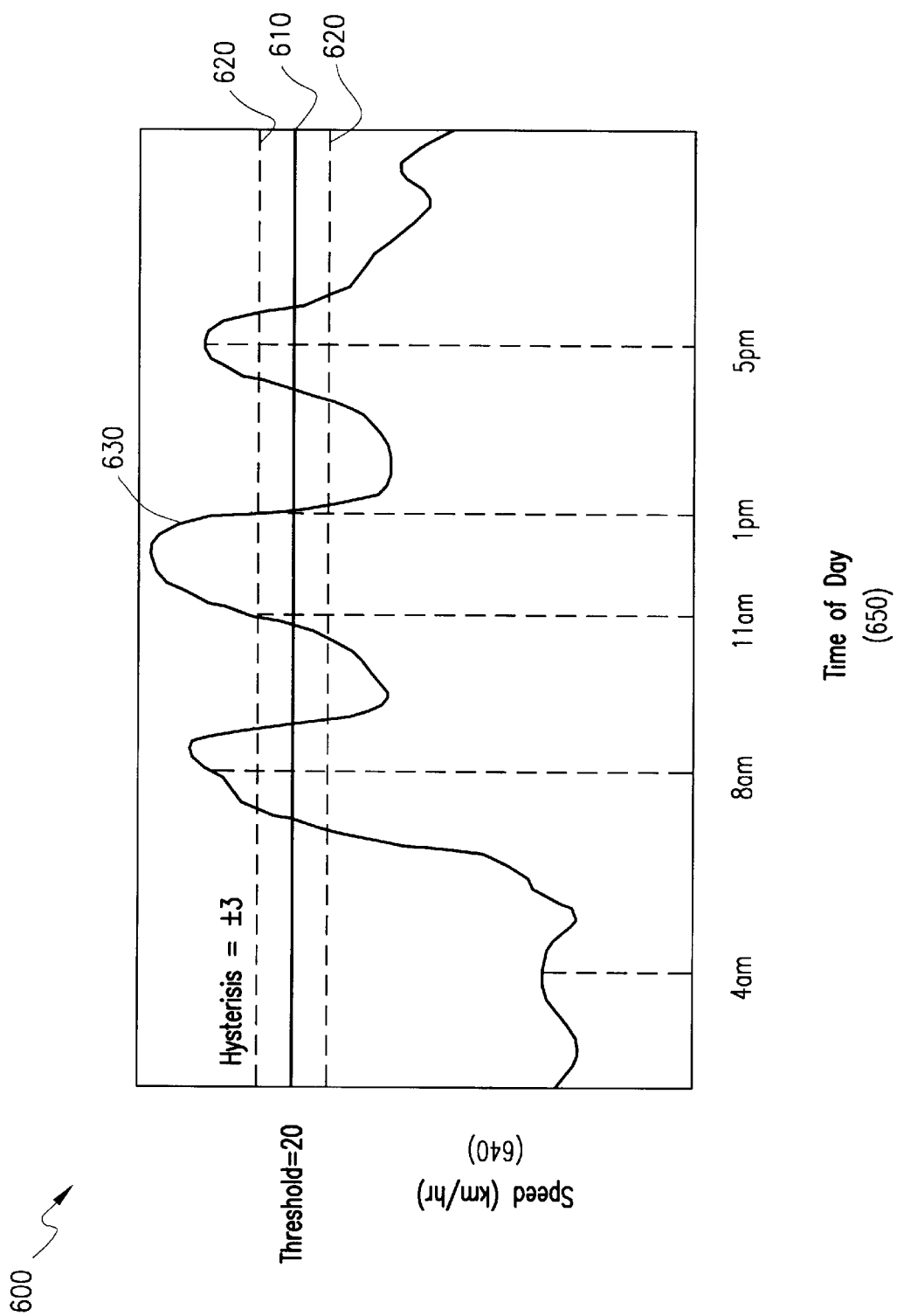
FIG. 6 illustrates an exemplary execution of the second embodiment of the present invention during a twenty-four hour period.

FIG. 6 illustrates an exemplary execution of the second embodiment of the present invention during a twenty-four hour period. This hypothetical situation, as diagramed in Graph 600, illuminates the operation of the present invention in practice. Initially, an operator decides to use a combination of Doppler Shift and Timing Advance to measure the speed of mobile stations 125 in the cell 130. After studying the traffic characteristics in the relevant cell 130, and understanding that the choice of the DS and TA measurement methods does not give accurate results (due to the direction of travel being unknown), the operator selects a speed threshold 610 of 20 km/hr. In addition to the threshold, the operator sets a hysteresis value 620 of ±3 km/hr.

The sampling rate of both the DS and TA methods is 50 ms. The operator sets the T1 filter length to 5 minutes on the assumption that 6000 measurements are sufficient. Further assuming that the average speed of mobile stations 125 does not change significantly over a short interval, and not wishing to change the hopping sequence state too often, the operator decides to set T2 to 30 minutes.

The process of the second embodiment of the present invention, as represented by flowchart 500, begins in phase ①. The speed is then sampled in phase ②. After 5 minutes (T1), the speed is averaged with 6000 samples (phase ③). Graph 600 shows a plot 630 of the average mobile speed (640) in the cell 130, throughout a 24 hour period (650), as measured and determined by phases ①–③. The plot 630 shows high speeds during peak commuting hours (e.g., around 8:00 a.m., during lunchtime, and again around 5:00 p.m.) when subscribers are likely to be on the move.

Between 11:00 a.m. and 1:00 p.m. (lunchtime), the average speed of all mobile stations 125 in the cell 130 is above 23 km/hr (threshold+hysteresis). According to phases ④–⑥, a random sequence is desired. During mid-morning, the hopping sequence state in the cell 130 will be cyclic because the average speed is below 17 km/hr (threshold–hysteresis). At 11:00 a.m., the state will be changed to random, and T2 will be initialized again. At 11:30 a.m., T2 will expire, and the speed will be measured continuously, and averaged every 5 minutes (T1). At 1:00 p.m., the average speed drops below 23 km/hr. As Graph 600 shows, the speed drops below 17 km/hr approximately 15 minutes later. At this time, the hopping state will change to cyclic, and the 30 minute (T2) delay will be reinitialized.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A telecommunications system for selective frequency hopping among a plurality of mobile stations within said system, said system comprising:

speed measuring means for measuring respective speeds of said plurality of mobile stations;

frequency hopping determining means for selectively determining a frequency hopping sequence for said plurality of mobile stations based upon said respective speeds of said plurality of mobile stations; and switching means for switching said frequency hopping sequence of said plurality of mobile stations pursuant to said respective speeds.

2. The telecommunications system according to claim 1, wherein after said switching means switches said frequency hopping sequence of said plurality of mobile stations, a delay means delays further switching for a predetermined time period.

3. The telecommunications system according to claim 1, wherein said speed measuring means determines an average of said respective speeds of said plurality of mobile stations, said frequency hopping determining means selectively determines said frequency hopping sequence based upon said average speed, and said switching means switches said frequency hopping sequence pursuant to said average.

4. The telecommunications system according to claim 3, wherein said average is a mean.

5. The telecommunications system according to claim 3, wherein said average is a mode.

6. The telecommunications system according to claim 3, wherein said speed measuring means determines said average over a predetermined averaging period.

7. The telecommunications system according to claim 3, wherein said speed measuring means computes said average using a speed measurement techniques, said speed measurement techniques being selected from the group consisting of timing advance, handover timing, locating procedures and Doppler measurements.

8. The telecommunications system according to claim 3, wherein said frequency hopping sequence is cyclic when said average is below a predetermined speed threshold.

9. The telecommunications system according to claim 3, wherein said frequency hopping sequence is random when said average is above a predetermined speed threshold.

10. The telecommunications system according to claim 1, wherein said frequency hopping determining means compares said respective speeds to a predetermined threshold.

11. The telecommunications system according to claim 10, wherein said predetermined threshold further comprises a hysteresis value.

12. The telecommunications system according to claim 10, wherein said predetermined threshold is about 35 km/hour.

13. The telecommunications system according to claim 1, wherein said system for selective frequency hopping operates substantially in real time.

14. In a telecommunications system having a plurality of mobile stations, a method for selective frequency hopping of said plurality of mobile stations, said method comprising the steps of:

measuring respective speeds of said plurality of mobile stations;

determining a frequency hopping sequence for said plurality of mobile stations based upon said respective speeds of said plurality of mobile stations; and switching said frequency hopping sequence of said plurality of mobile stations pursuant to said respective speeds.

15. The method according to claim 14, further comprising, after said step of switching, the step of:

delaying said measuring for a predetermined delay period.

16. The method according to claim 14, wherein said step of measuring further comprises computing an average of said respective speeds of said plurality of mobile stations, said step of determining selecting said frequency hopping sequence based upon said average, and said frequency hopping sequence switched pursuant to said average.

17. The method according to claim 16, wherein said average computed in said step of measuring is a mean.

18. The method according to claim 16, wherein said average computed in said step of measuring is a mode.

19. The method according to claim 16, wherein said average computed in said step of measuring is computed over a predetermined averaging period.

20. The method according to claim 16, wherein said computing of said average in said step of measuring computes said average by a speed measurement techniques, said speed measurement techniques being selected from the group consisting of timing advance, handover timing, locating procedures and Doppler measurements.

21. The method according to claim 16, wherein said frequency hopping sequence is cyclic when said average is below a predetermined speed threshold.

22. The method according to claim 16, wherein said frequency hopping sequence is random when said average is above a predetermined speed threshold.

23. The method according to claim 14, wherein said step of determining compares said respective speeds to a predetermined threshold.

24. The method according to claim 23, wherein said predetermined threshold further comprises a hysteresis value.

25. The method according to claim 23, wherein said predetermined threshold is about 35 km/hour.

26. The method according to claim 14, wherein said method operates substantially in real time.

* * * * *